US007214132B2

(12) United States Patent
Inoue

(10) Patent No.: US 7,214,132 B2
(45) Date of Patent: May 8, 2007

(54) SYMBOL DISPLAY APPARATUS FOR GAME MACHINE

(75) Inventor: Haruo Inoue, Tokyo (JP)

(73) Assignee: Dragon Co., Ltd., Tokyo (JP)

( * ) Notice: Subject to any disclaimer, the term of this patent is extended or adjusted under 35 U.S.C. 154(b) by 770 days.

(21) Appl. No.: 10/242,637

(22) Filed: Sep. 13, 2002

(65) Prior Publication Data

US 2004/0038726 A1 Feb. 26, 2004

(30) Foreign Application Priority Data

Aug. 23, 2002 (JP) ............................ 2002-243958

(51) Int. Cl.
*G06F 17/00* (2006.01)

(52) U.S. Cl. .................................... 463/20; 273/143 R

(58) Field of Classification Search ............ 463/16–17, 463/20–22, 30; 273/138.1, 138.2, 143 R
See application file for complete search history.

(56) References Cited

U.S. PATENT DOCUMENTS

| | | | | |
|---|---|---|---|---|
| 5,152,529 | A * | 10/1992 | Okada | 463/20 |
| 5,395,111 | A * | 3/1995 | Inoue | 273/143 R |
| 5,752,881 | A * | 5/1998 | Inoue | 463/20 |
| 6,027,115 | A * | 2/2000 | Griswold et al. | 273/143 R |
| 6,056,642 | A * | 5/2000 | Bennett | 463/20 |
| 2004/0012145 | A1* | 1/2004 | Inoue | 273/143 R |
| 2004/0014516 | A1* | 1/2004 | Inoue | 463/20 |
| 2004/0014517 | A1* | 1/2004 | Inoue | 463/20 |
| 2004/0017041 | A1* | 1/2004 | Inoue | 273/143 R |
| 2004/0036218 | A1* | 2/2004 | Inoue | 273/292 |
| 2005/0026854 | A1* | 2/2005 | Young | 514/44 |
| 2005/0043083 | A1* | 2/2005 | Inoue | 463/20 |
| 2005/0043084 | A1* | 2/2005 | Inoue | 463/20 |

FOREIGN PATENT DOCUMENTS

| | | |
|---|---|---|
| JP | 3-60681 | 3/1991 |
| JP | 2001104540 A * | 4/2001 |

OTHER PUBLICATIONS

English translation of JP 2001-104540, pp. 13.*

* cited by examiner

*Primary Examiner*—Robert P. Olszewski
*Assistant Examiner*—Alex F. R. P. Rada, II
(74) *Attorney, Agent, or Firm*—Young & Thompson

(57) ABSTRACT

A symbol display apparatus for game machine includes lined up plural reel units. Each reel unit has double reel structure composed of an outer reel and an inner reel. Inside the inner reel, backlights are disposed. Peripheries of the outer and inner reels are so colored lightly as to be semitransparent, so the outer and inner reels make an object disposed inside indistinct but transmit light. Inner symbols arranged on the periphery of the inner reel are printed with light color. When the inner and outer symbols are overlapped, the backlight emits white light. Color of the inner symbol illuminated with the white light does not affect adversely to appearance of the outer symbol. When the inner symbol is displayed through a transparent portion provided in the outer reel, the backlight emits light color of which is correspondent to the inner symbol for displaying the inner symbol emphatically and clearly.

17 Claims, 8 Drawing Sheets

SYMBOL DISPLAY APPARATUS FOR GAME MACHINE

BACKGROUND OF THE INVENTION

1. Field of the Invention

The present invention relates to a symbol display apparatus used for a game machine, such as a slot machine, a pachinko machine, and the like.

2. Background Arts

Many game machines such as a slot machine, a pachinko machine, and the like are equipped with a symbol display apparatus. As for the known symbol display apparatus for the game machine, for example, there are a mechanical reel type using reels outer peripheries of which carry plural kinds of symbols, and a video type displaying simulative reels on a CRT or a liquid crystal display based on graphic data stored on a ROM.

In the slot machine, when a start button or a start lever is operated after insertion of a coin (the coin described in this specification includes a token and a medal.), symbols start rotating. Then, when the reels are stopped by operation of stop buttons provided for each of the reels, or the reels stop automatically after passing predetermined time, a win or loss is decided according to a combination of the symbols displayed on a winning line crossing display windows. When a win occurs, coins the number of which is correspondent to the combination of the symbols are paid out as a prize.

By the way, an ordinary symbol display apparatus has a disadvantage that a game tends to be monotonous because only one symbol combination is completed in one game. Also in the symbol display apparatus of the mechanical reel type, it is difficult to increase diversity of the symbol combinations because many kinds and a number of symbols cannot be arranged on one reel. To solve this disadvantage, are suggested various symbol display apparatuses having a double reel, which is composed of an outer reel and an inner reel rotating inside the outer reel. Japanese Patent Laid-Open Publication No. 3-60681 discloses to form an opening in a reel body of the outer reel which is made of light shielding material. In a slot machine disclosed in the document, when the outer reel stops and the opening appears in the display window the inner reel rotates again and changes the symbol, so that another chance for a win is given to a lost game.

However, in the symbol display apparatus with the double reel like above, inner symbols arranged on the inner reel and outer symbols arranged on the outer reel are overlapped. Therefore, there is a disadvantage that when a backlight disposed inside the inner reel illuminates the inner and outer reels, colors of the inner symbols are reflected in the outer symbols and spoil appearance of the outer symbols. Against the disadvantage, there is away that does not color the inner symbols. However, this way makes it impossible to clear and emphasize a value and a part of each inner symbol.

SUMMARY OF THE INVENTION

A main object of the present invention is to provide a symbol display apparatus for a game machine in which when an outer symbol arranged on an outer reel overlaps with an inner symbol arranged on an inner reel, emission from a backlight does not make color of the inner symbol affect the outer symbol.

Another object of the present invention is to provide a symbol display apparatus for a game machine in which when an inner symbol is displayed through a transparent portion provided in an outer reel, the inner symbol is illuminated clearly and emphatically since a backlight emits light, color of which is correspondent to the inner symbol.

To achieve the above and other objects, a symbol display apparatus according to the present invention includes lined up plural reel units. Each of the plural reel units is composed of an outer reel having a semitransparent outer periphery which is so colored lightly as to make the inside invisible, and outer reel which is so disposed as to be rotatable concentrically with and independently of the outer reel, and a backlight disposed inside the inner reel. On the outer periphery of the outer reel, outer symbols and at least one transparent portion are arranged. When the outer reel stops rotating, the random outer symbols can be seen through the display windows. When the transparent portion is displayed through the display window, an inner symbol is displayed through the transparent portion.

The backlight includes plural light emitting diodes. Each or plural of the light emitting diodes emit light simultaneously to generate plural colored light. Emission from the backlight is controlled based on kinds and combinations of symbols displayed in the display windows. When the inner symbol is displayed through the transparent portion, for example, the backlight emits the colored light corresponding to the inner symbol. Therefore, the inner symbol, which is printed with light color, is displayed emphatically and clearly. Also when the outer symbol is displayed, namely the outer symbol is overlapped with the inner symbol, the backlight emits light from behind of the inner symbol but color of the inner symbol does not affect inversely to appearance of the outer symbol because the inner symbol is printed with the light color.

In the present invention, since an outer periphery of the inner reel is so formed as to transmit only light by coloring transparent plastic lightly, the emission from the inside of the inner reel illuminates the outer symbol clearly from behind without displaying the inner symbol.

BRIEF DESCRIPTION OF THE DRAWINGS

The above and other objects and advantages of the present invention will become apparent from the following detailed description of the preferred embodiment when read in association with the accompanying drawings, which are given by way of illustration only and thus are not limiting the present invention. In the drawings, same reference numerals designate like or corresponding parts throughout the several views, and wherein.

DETAILED DESCRIPTION OF THE EMBODIMENTS

Figure 1:
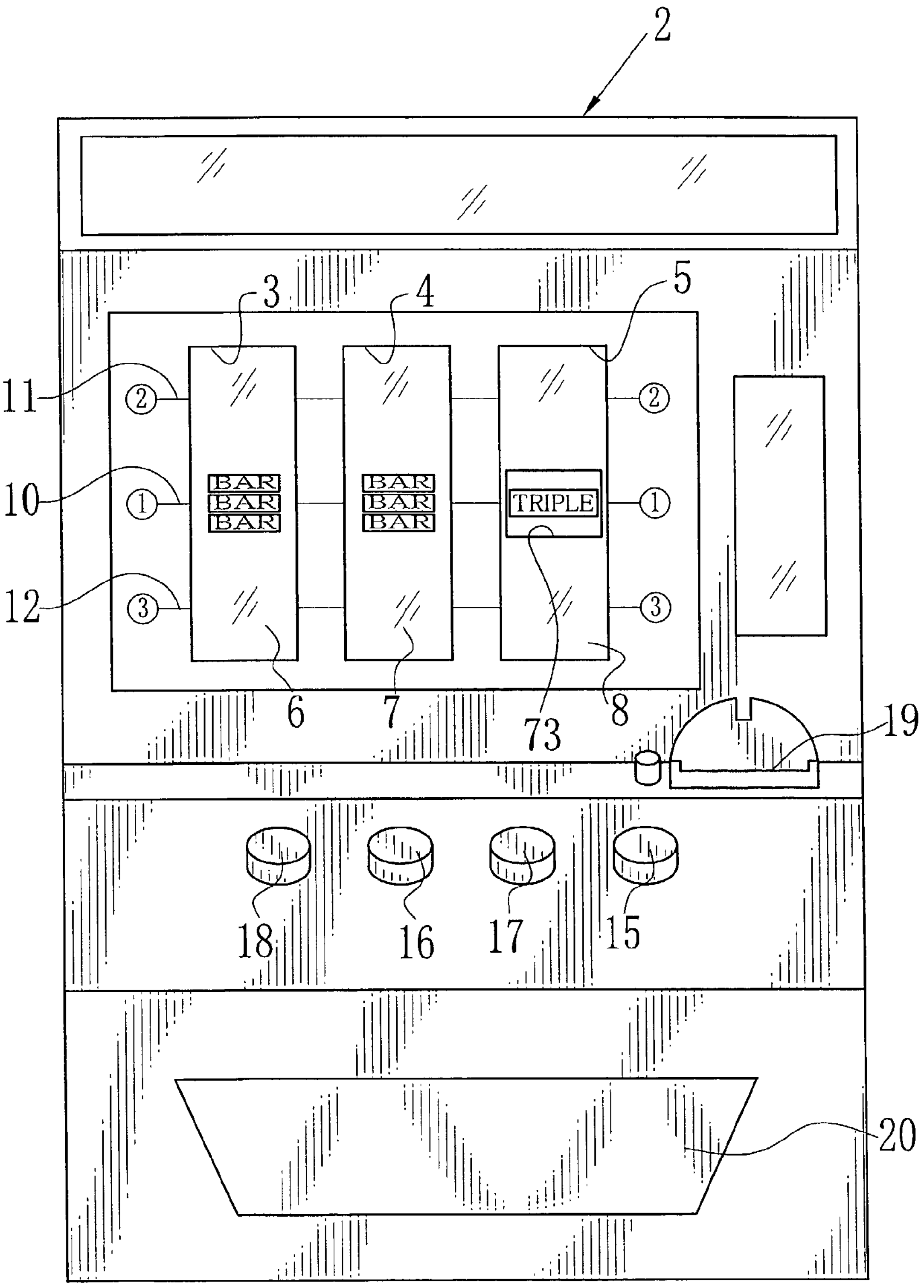
FIG. 1 is a front view showing a front surface of a slot machine.

Referring to FIG. 1, there are provided three display windows 3 to 5 in the middle of a front panel of a slot machine 2. Inside these display windows 3 to 5, is disposed a symbol display apparatus 80 (refer to FIG. 6) including the first, second, and third reel units 6 to 8. When the first, second, and third reel units 6 to 8 stop, three symbols per a reel unit are observable through the display windows 3 to 5. Besides, it is possible to dispose the first, second, and third reel units 6 to 8 inside one large display window.

Below the display windows 3 to 5, there are a spin button 15, a one-bet button 16, a max bet button 17, a payout button 18, and a coin slot 19. One or plural coins are bet by means of operating the one-bet button 16 or the max bet button 17 after insertion of coins into the coin slot 19. Parallel three winning lines 10 to 12 are provided across the display windows 3 to 5, and the number of the effective winning lines increases in accordance with the number of bet coins. When one coin is bet, for instance, the middle winning line 10 becomes effective. When two coins are bet the middle and upper winning lines 10 and 11 become effective, and when the three coins are bet all winning lines 10 to 12 become effective. In operating the max bet button 17, the three winning lines 10 to 12 become effective. Besides, the number of the winning lines themselves and the number of the winning lines becoming effective by means of betting coins are not limited to a foregoing description and changeable properly. Also coins counted by a credit counter can be used for bet, besides the coins actually inserted into the coin slot 19.

When the spin button 15 is operated after the bet, the first, second, and third reel units 6 to 8 are driven simultaneously. The first, second, and third reel units 6 to 8 show symbols moving downward. Result of a game is determined depending on a combination of symbols displayed along the effective winning lines when all reel units 6 to 8 stop. When a win is obtained, prize coins are paid out the number of which is predetermined depending on the type of the combination.

Figure 2:
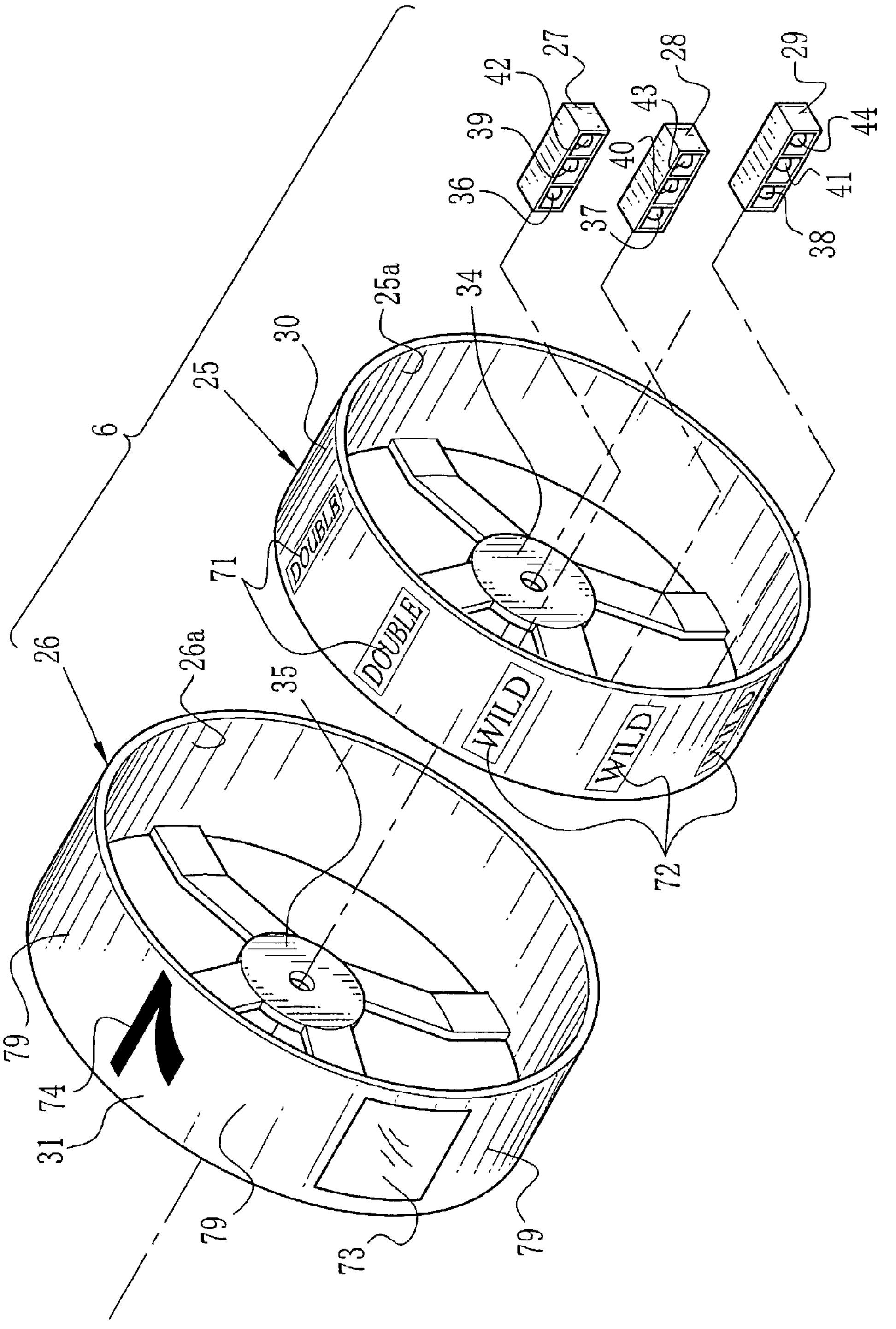
FIG. 2 is a perspective view of a reel unit.

Referring to FIG. 2, each of the first, second, and third reel units 6 to 8 is composed of an outer reel 26 and an inner reel 25 disposed concentrically inside the outer reel 26. Inside the inner reel 25, there are arranged three backlights 27 to 29 in the same structure. Now structure of the reel units 6 to 8 will be described with taking the first reel unit 6 as an example, because all reel units 6 to 8 have the same structure.

Peripheries **25*a* and 26*a* of the inner and outer reels 25 and 26 are made of durable and transparent plastic. The exteriors of the peripheries 25*a* and 26*a* are wrapped in an inner symbol sheet 30 and an outer symbol sheet 31, respectively. The inner symbol sheet 30 and the outer symbol sheet 31 become semitransparent by means of lightly coloring the transparent plastic. On the inner and outer symbol sheets 30 and 31, plural types of symbols, as will hereinafter be described, are printed. Thus, even though the inner and outer reels 25 and 26 are illuminated with the backlights 27 to 29 being inside the first reel unit 6, a player cannot distinctly see an object itself being inside the periphery 26*a* of the outer reel 26 through the display window 3 because of the light diffusion in the inner and outer symbol sheets 30 and 31. Also there is a transparent portion 73, which is never colored, in the outer symbol sheet 31. When the transparent portion 73 appears in the display window 3, the player can see an inner symbol arranged on the inner reel 25 through the transparent portion 73**.

Attachment boards 34 and 35 are formed integrally with the inner and outer reels 25 and 26, respectively. The inner and outer reels 25 and 26 are connected to stepping motors 98 and 105 (refer to FIG. 6) via the attachment boards 34 and 35, respectively. Thus, the inner and outer reels 25 and 26 are rotated independently by the stepping motors 98 and 105.

The backlights 27 to 29 illuminate each of symbols on the upper, middle, and lower winning lines 11, 10, and 12. Each of the backlights 27 to 29 has one of red LEDs 36 to 38, one of blue LEDs 39 to 41, and one of green LEDs 42 to 44. In each of the backlights 27 to 29, three different colored LEDs are so arranged as to be separated each other by partitions. Also because the backlights 27 to 29 themselves are so arranged as to be separated each other by partitions, a symbol on the middle winning line 10, for example, is illuminated only by the backlight 28, not by the other backlights 27 and 29.

Figure 3:
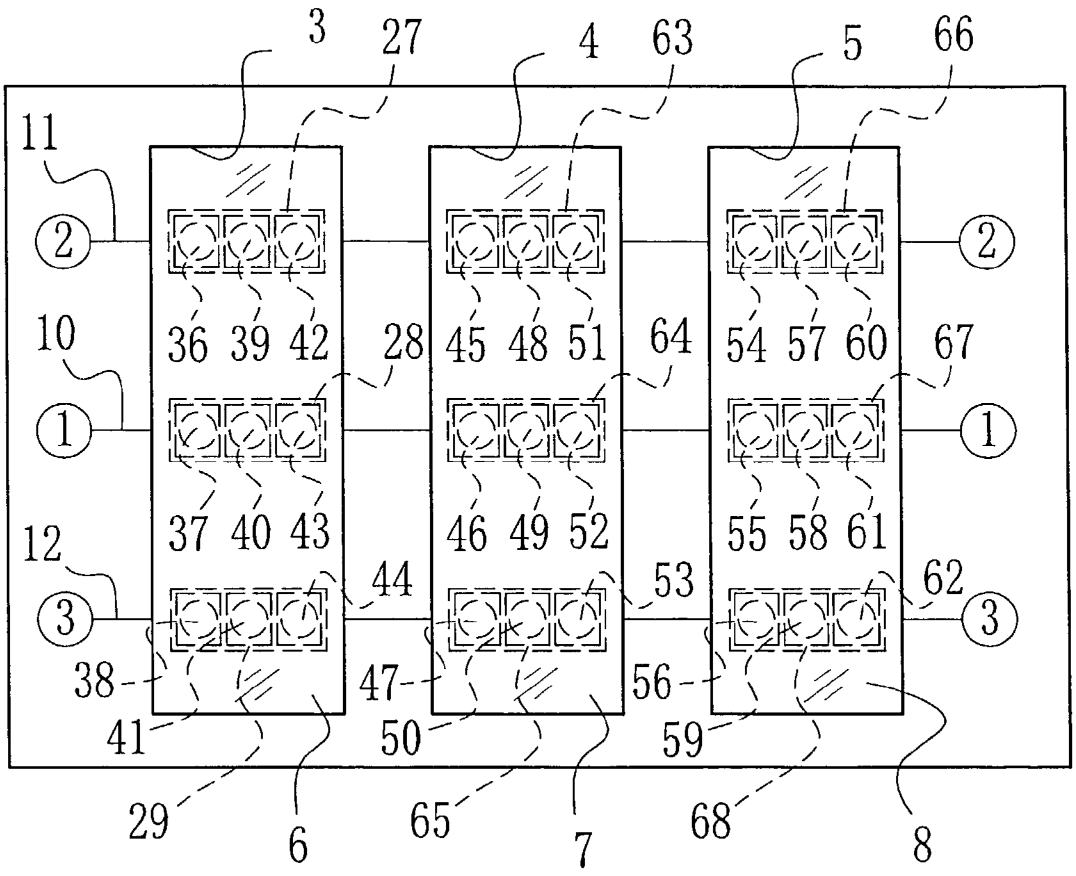
FIG. 3 is a front view showing a physical relationship between display windows and backlights.

In FIG. 3, the backlights 63 to 65 and 66 to 68 are arranged inside the second and third reel units 4 and 5, respectively. The backlights 27, 63, and 66 illuminate symbols on the winning line 11, the backlights 28, 64, and 67 illuminate symbols on the winning line 10, and the backlights 29, 65, and 68 illuminate symbols on the winning line 12.

Figure 4:
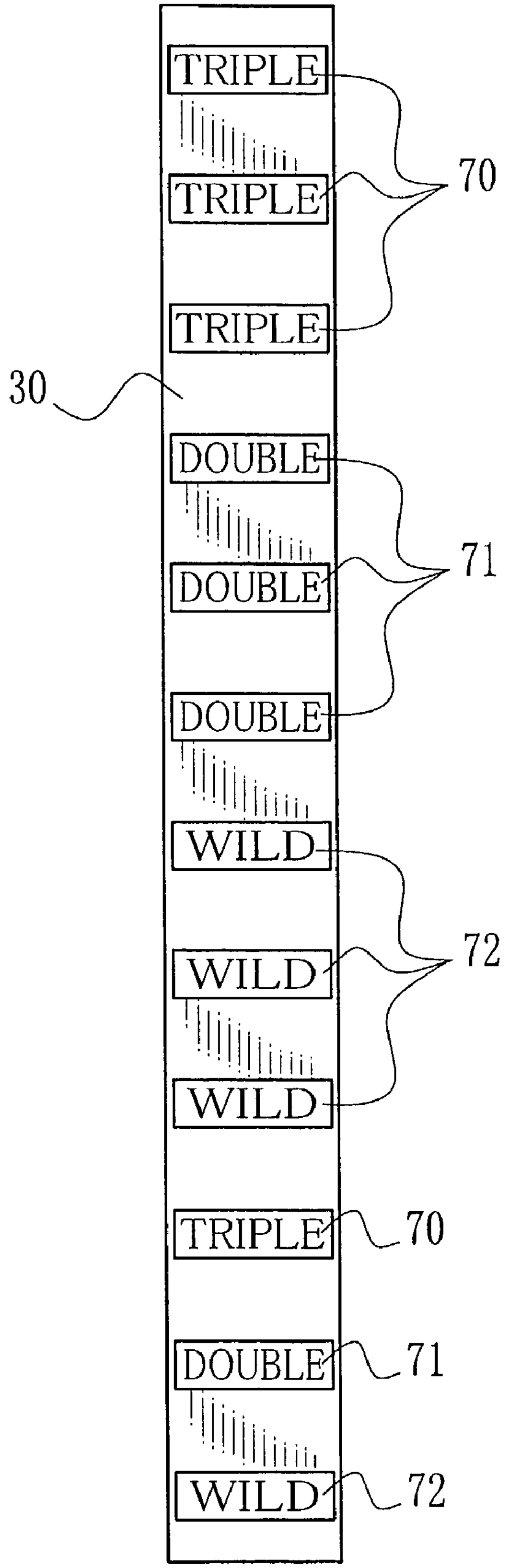
FIG. 4 is an expansion view of an inner symbol sheet on which inner symbols are printed.

Referring to FIG. 4, three kinds of symbols, namely, TRIPLE 70, DOUBLE 71, and WILD 72 are printed at a predetermined pitch on the inner symbol sheet 30. The color of the TRIPLE 70 is monotonous light pink, the DOUBLE 71 is monotonous light blue, and the WILD 72 is monotonous light green. Because all inner symbols are printed in colors with high lightness and low saturation like pastel colors, the colors of the inner symbols printed on the inner symbol sheet 30 are not reflected in the outer symbol sheet 31 when backlights 27 to 29 emit light. Therefore, it is possible to prevent appearance of the outer symbols from being spoiled.

Figure 5:
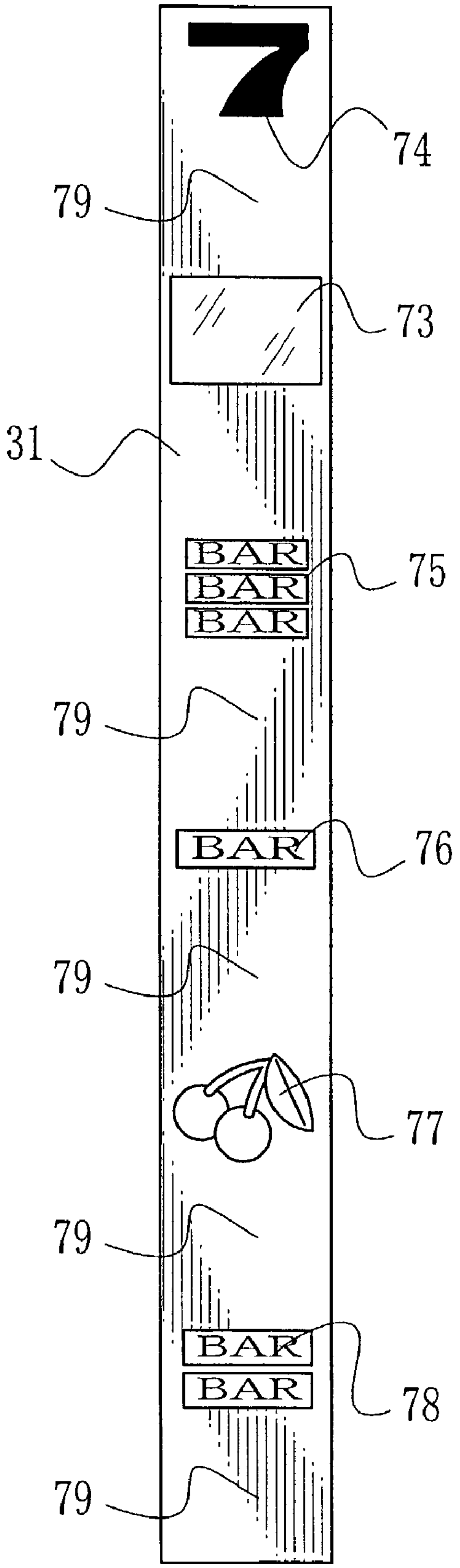
FIG. 5 is an expansion view of an outer symbol sheet on which outer symbols are printed.

Referring to FIG. 5, there are the transparent portion 73, a blank 79 colored lightly, and five kinds of outer symbols 74 to 78 printed on the outer symbol sheet 31. This outer symbol sheet 31 is made of a transparent plastic film on which whole surface other than the transparent portion 73 is colored lightly. The outer symbols 74 to 78 are printed on the outer symbol sheet 31 with opening a space of a blank 79 corresponding to one symbol. The blank 79, which becomes semitransparent with coloration, is lighted up by the illumination from the backlight, but makes the inner symbols 70 to 72 being inside out of sight.

When three the same kind of outer symbols 74 to 78 are lined up on any of the effective winning lines 10 to 12, the game results in a win. Also when three transparent portions 73 are lined up on any effective winning line and three the same kind of inner symbols 70 to 72 are displayed through these transparent portions 73, the game results in a win. A prize according to this combination is higher than that according to a winning symbol combination composed of the only outer symbols 74 to 78. When two the same kind of outer symbols 74 to 78 are lined up on any effective winning line and the rest is the transparent portion 73, the game results in a win too. A prize according to this combination is a multiple of the prize according to the winning symbol combination composed of the only outer symbols. A multiplier is determined depending on the inner symbol displayed through the transparent portion 73. When the inner symbol is the TRIPLE 70, the multiplier is 3 and the prize is increased by three. In the DOUBLE 71, the prize is doubled. In the WILD 72, the multiplier is 1, and the prize is the same as that according to the winning symbol combination composed of the only outer symbols.

Figure 6:
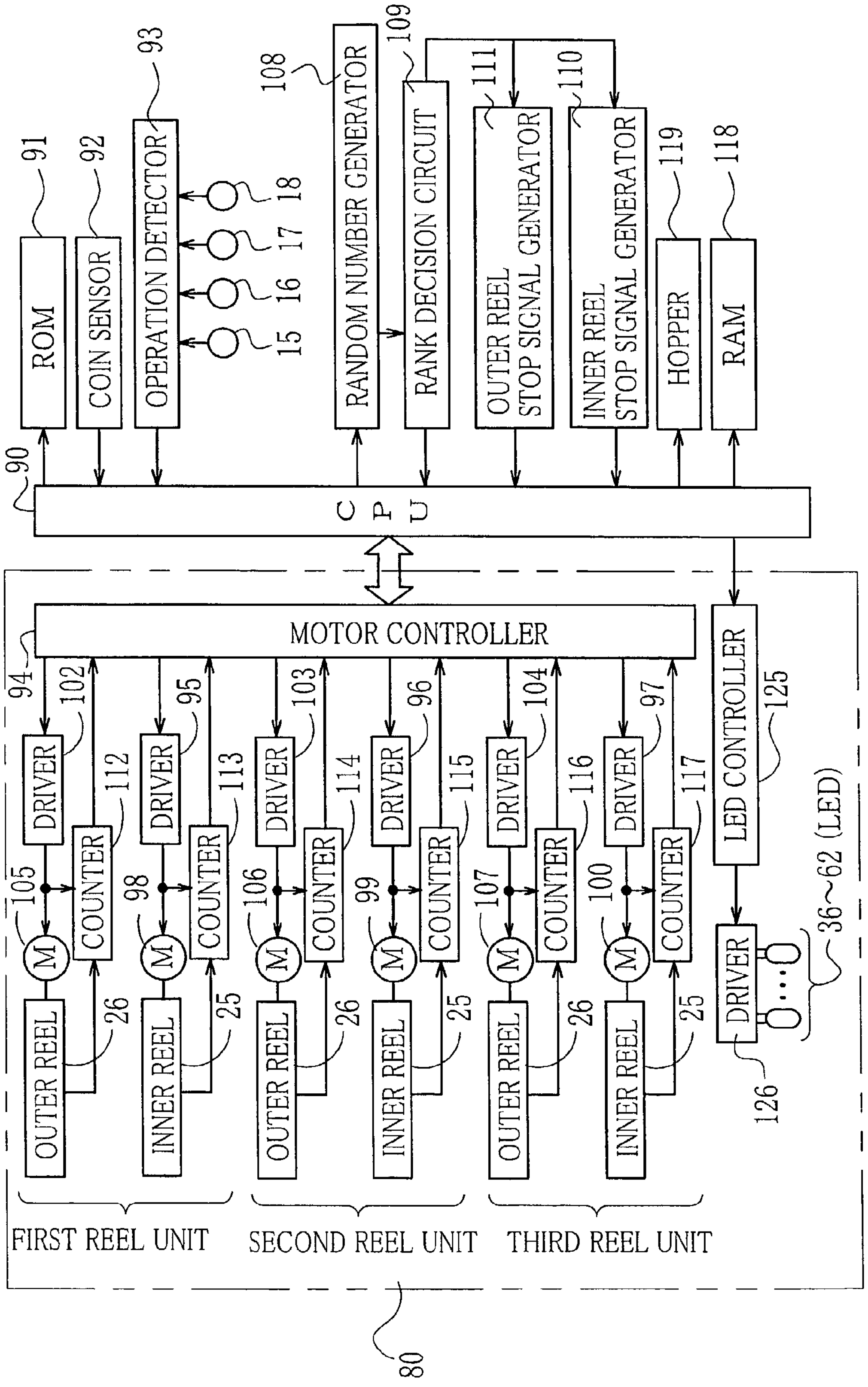
FIG. 6 is a block diagram showing electrical circuit in the slot machine.

Referring to the FIG. 6, the slot machine 2 starts operating as a CPU 90 loads an executive program of the game from a ROM 91. A coin sensor 92 provided inside the coin slot 19 outputs a coin detection signal to the CPU 90 whenever the coin sensor 92 detects proper insertion of a coin.

When the one-bet button 16 or the max bet button 17 is operated, an operation detector 93 sends an operation signal to the CPU 90. Also when the spin button 15 is operated, a start signal is sent to the CPU 90. The CPU 90 activates a motor controller 94 in response to the start signal. The motor controller 94 supplies drive pulses to stepping motors 98 to 100 and 105 to 107 via drivers 95 to 97 and 102 to 104, so that the inner and outer reels 25 and 26 in the first, second, and third reel units 6 to 8 are rotated independently.

When the start signal is input, the CPU 90 activates a random number generator 108. The random number generator 108 samples one random number, and the random number is input to a rank decision circuit 109. Based on the random number, the rank decision circuit 109 decides a win or loss by lottery. When the win is decided, a rank of the win is decided by the lottery too. The rank decision circuit 109 decides a winning line to arrange the winning combination and kinds of symbols displayed on the winning line. Also the rank decision circuit 109 decides which of the backlights 27 to 29, 63 to 65, and 66 to 68 are emitted during the game. After the lottery by the rank decision circuit 109, a judgment signal corresponding to the rank of the win is sent to the CPU 90.

Passing predetermined time after the lottery, the CPU 90 activates an inner reel stop signal generator 110 and an outer reel stop signal generator 111. The inner reel stop signal generator 110 and the outer reel stop signal generator 111 output stop position signals which indicate stop positions in rotation of the stepping motors 98 to 100 and 105 to 107 to the CPU 90, so that the symbols according to the results of the lottery stop on the winning lines 10 to 12. The CPU 90 outputs a signal to the motor controller 94 for stopping the stepping motors 98 to 100 and 105 to 107 based on the stop position signals.

The drive pulses are input to and counted by counters 112 to 117 besides being sent to the stepping motors 98 to 100 and 105 to 107. Each of the inner and outer reels 25 and 26 is so provided with a guide mark indicating a reference position as to observe its rotation by a photo interrupter. Every time the inner and outer reels 25 and 26 make one rotation, the photo interrupters output reset signals to reset values counted in counters 112 to 117. Therefore, the values counted in the counters 112 to 117 indicate rotational positions within one rotation. Since the reference positions of the inner and outer reels 25 and 26, and the arrangements and the kinds of the inner and outer symbols have been already known, it is possible to recognize the kinds of symbols displayed in the display windows 3 to 5 by means of observing the number of the drive pulses supplied to the stepping motors 98 to 100 and 105 to 107 by counters 112 to 117.

When a symbol combination arranged on the winning line results in a win, the CPU 90 refers to a payout coin number table stored on a ROM 91, and stores the number of paid out coins corresponding to the type of the win on a RAM 118. In operating the payout button 18, a hopper 119 is activated and coins the number of which is stored on the RAM 118 are paid out to an outlet 20. The RAM 118 has an area for storing the number of bet coins, an area for storing the number of inserted coins, and the like, besides an area for storing the number of the paid out coins. Also the RAM 118 is used for a memory for temporarily storing various data obtained during the game.

In response to various cases in the game the CPU 90 activates an LED controller 125. The LED controller 125 controls emission from each of the red, blue, and green LEDs 36 to 62 arranged in the backlights 27 to 29, 63 to 65, and 66 to 68 through a driver 126. Taking a case, for example, where one of the inner symbols is displayed through the transparent portion 73 in any position on the effective winning lines, the LED controller 125 makes the LED the color of which is correspondent to the displayed inner symbol emit light. Namely, when the TRIPLE 70 stops the red LED emits light. When the DOUBLE 71 stops, the blue LED emits light. When the WILD 72 stops, the green LED emits light. Therefore, it is possible to display the inner symbols clearly and emphatically in the display windows 3 to 5 even through the transparent portion 73.

It is possible to compound light of plural colors into light of an unrelated color to the inner symbols arranged on the inner reel 25, since plural colored LEDs, out of the red, blue, and green, emit light instantaneously in each of the backlights 27 to 29, 63 to 66, and 66 to 68. The compounded light can be used for an ordinary colored light in various scenes during the game. As the ordinary colored light, white light can be mentioned, for example, which is generated by the instantaneous emission of the light from the all three colored LEDs. When any of the outer symbols 74 to 78 stops on the effective winning lines, this white light is emitted. When the red, blue, and green LEDs emit the light instantaneously, it does not matter if there is a timing error in starting and stopping the emission.

Figure 7:
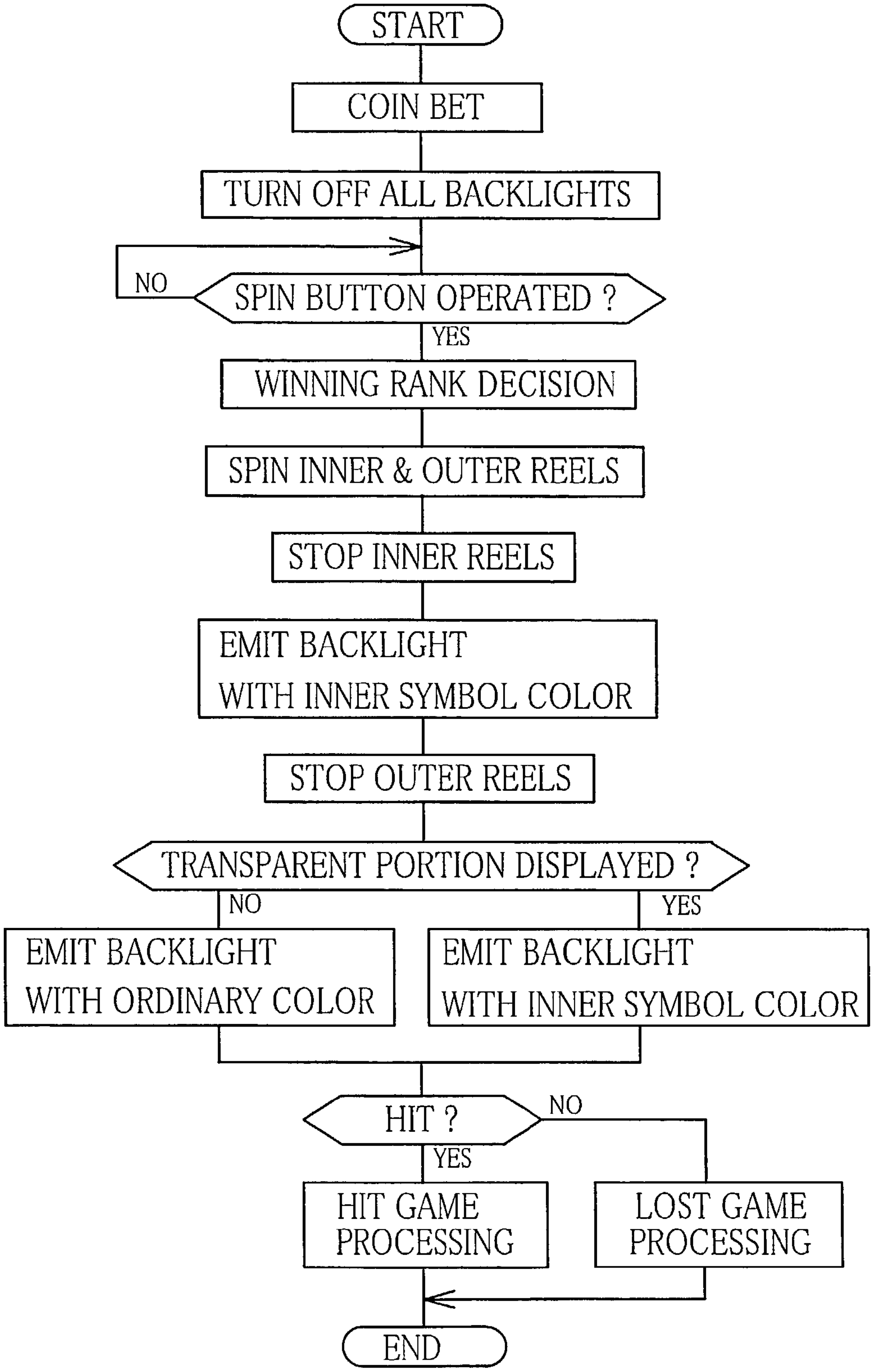
FIG. 7 is a time chart showing a flow of a game.

Now, operation of the slot machine 2 having a foregoing structure will be described in reference to a flow chart of FIG. 7. When a player inserts a number of coins into the coin slot 19, and bets the coins by operating the one-bet button 16 or the max bet button 17, the winning lines become effective in response to the number of bet coins. Then all backlights 27 to 29, 63 to 65, and 66 to 68 are turned off.

In operating the spin button 15, the CPU 90 activates the random number generator 108, and the rank decision circuit 109 decides a win or loss by lottery. Then, the CPU 90 makes the inner and outer reels 25 and 26 in the first, second, and third reel units 6 to 8 start rotating instantaneously through the motor controller 94.

Passing predetermined time after the inner and outer reels 25 and 26 start rotating, the CPU 90 makes the inner reels 25 in the first, second, and third reels 6 to 8 stop on the basis of the decision by the rank decision circuit 109. Then, the inner symbols stop on the effective winning lines are decorated with the lights from the backlights. The color of each light is correspondent to the kind of the inner symbol. The player cannot see the stopping inner symbols at this time because of the rotation of the outer reels 26, but can judge the kinds of the symbols from the colors of the backlights. Therefore, the player places more expectation on stopping conditions of the outer reels 26, that is, where the transparent portions 73 of the outer reels 26 stop.

Figure 8:
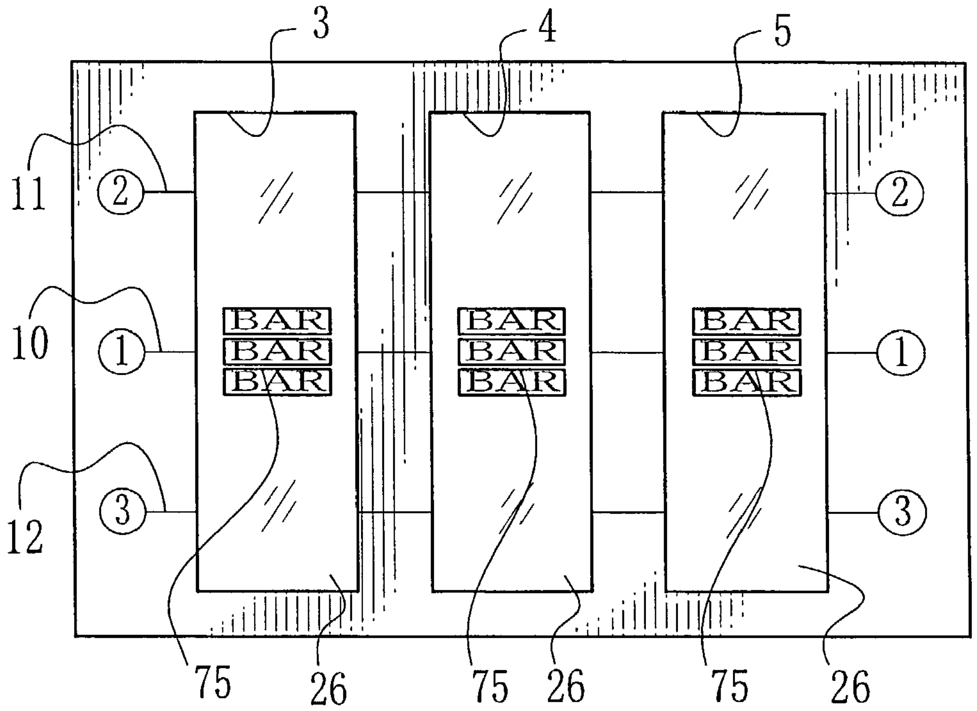
FIG. 8 is a front view of a symbol display apparatus showing an example of a condition when a winning combination composed of the outer symbols is displayed.
Figure 9:
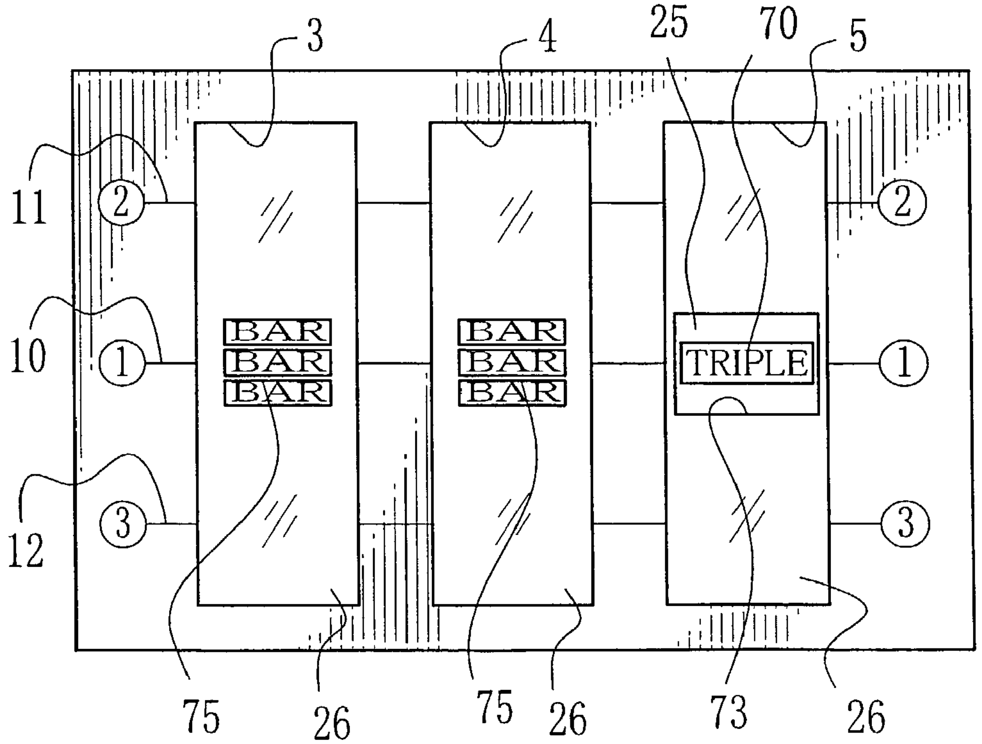
FIG. 9 is a front view of the symbol display apparatus showing an example of a condition when a winning combination composed of the outer symbol and the inner symbol is displayed.

After passing the predetermined time, the CPU 90 stops the outer reels 26 in order of the outer reel 26 in the first reel unit 6, the outer reel 26 in the second reel unit 7, and then the outer reel 26 in the third reel unit 8, at positions corresponding to the result of the lottery. Then, as shown in FIG. 8, when the three outer symbols 75 are lined up on the effective winning line, e.g. the winning line 10, the backlights 28, 64, and 67 positioned behind each of the outer symbols emit the white light. On the other hand, as shown in FIG. 9, when the two outer symbols 75 and a transparent portion 73 stop on the winning line 10, the backlight 67 behind the transparent portion 73 emits light the color of which is correspondent to the inner symbol 70 displayed though the transparent portion 73, and the backlights 28 and 64 in the position of the outer symbols emit white light.

As just described, the outer symbols are illuminated with the white light from behind. The inner symbol is illuminated with the light the color of which is correspondent to the kind of the inner symbol from behind, and observed through the transparent portion 73. Each symbol is illuminated with the correspondent colored light, so the player can know the symbol combination indirectly.

When the transparent portion 73 stops on the winning line 10, the backlight emitting the colored light corresponding to the inner symbol may be turned off once and turned on again, or may continue the emission. The backlights on the winning line may blink if a win occurs, and the backlights on the winning line may go off if a loss occurs, in order to inform the result of the game to the player.

After all of the inner and outer reels 25 and 26 stop, coins the number of which is correspondent to the type of the win are paid out in case of the win, or a process for the lost game is carried out in case of the loss, then the game ends.

In the above embodiment, the backlights positioned behind the outer symbols 74 to 78 emit the white light. However, it is possible to change color of the light for illuminating the outer symbols 74 to 78 properly within the colors which are not used for any of the inner symbols 70 to 72. Also, while the backlights behind the transparent portion 73 of the outer reel 26 emit the light the color of which is correspondent to the inner symbols 70 to 72, the backlights behind the outer symbols 74 to 78 may be turned off.

In the above embodiment, when the spin button 15 is operated, the inner and outer reels 25 and 26 start rotating instantaneously, but it is possible properly to change timing when each of the inner and outer reels 25 and 26 starts rotating. For example, the inner reel 25 may start rotating, after the outer reel 26 starts rotating and predetermined time is passed.

In the above embodiment, the outer reel 26 stops after the inner reel 25 stops, but it is possible properly to change timing when each of the inner and outer reels 25 and 26 stops. For example, the outer reel 26 may stop before the inner reel 25. In that case, because the light colored for the inner symbols 70 to 72 does not affect the outer symbols 74 to 78, the backlights can emit various colored light during the rotation of the inner reel 25 for boosting a mood. And when the inner reel 25 stops, the backlights behind the transparent portion 73 may emit the light the color of which is correspondent to the inner symbol 70 to 72, and the other backlights emit the ordinary colored light.

In the above embodiment, the inner symbols 70 to 72 are more valuable than the outer symbols 74 to 78. However, it is possible to properly change kinds of inner and outer symbols, a way to arrange, types of winning symbol combinations, prizes, and the like. In the above embodiment, the colors of the inner symbols are light pink, light blue, and light green, but the colors are changeable. Any proper color is usable provided the color does not affect the outer symbols.

In the above embodiment, the transparent portion 73 is formed out of the colorless and transparent plastic. However it is possible to color the transparent portion 73, and to change optical transmittance of the plastic in such a range that the player can see the inner symbols 70 to 72 through it. The inner and outer reels 25 and 26 may become light diffusive by means of making an inner surface of each of the inner and outer reels 25 and 26 rough or forming the both inner and outer reels 25 and 26 out of milky-white plastic. In that case, the transparent portion 73 is an opening, and the symbol sheets 30 and 31 are transparent plastic sheets on which symbols are printed.

In the above embodiment, red, blue, and green LEDs are used as light sources of the backlights 27 to 29, 63 to 65, and 66 to 68, but another illuminator like a lamp may be used as the light sources, provided the illuminator emits light the color of which is correspondent to the inner symbols. Also a way to arrange the light sources and colors of the light for the inner symbols are properly changeable.

In the above embodiment, three symbols are observed through each of the display windows 3 to 5, but the number is properly changeable. According to the number of the observable symbols, it is possible to change the number and positions of the winning lines properly.

In the above embodiment, the rotations of the inner and outer reels 25 and 26 are started by the operation of the spin button 15. However, when the max bet button 17 is operated, the inner and outer reels 25 and 26 may start rotating automatically before the operation of the spin button 15.

In the above embodiment, the rotations of the inner and outer reels 25 and 26 stop automatically after passing predetermined time, but it may be possible that operation of a button like a stop button makes the inner and outer reels 25 and 26 stop.

In the above embodiment, every reel unit has a double reel. However, one or two reel units may have a double reel, and the other may have a single reel. Also the number of the reel units may be four or five besides three. The symbol display apparatus according to the present invention can be used for a pachinko machine, and other game machines, in addition to the slot machine, too.

In the above embodiment, the win is decided based on the sampled random number, and then every reel is so controlled as to display the symbol combination corresponding to the result of the decision. However, it may be possible that symbols displayed by each reel including the inner and outer reels 25 and 26 are decided according to the sampled random number, and then a win is decided by combination of the symbols.

The number and the size of the transparent portions 73 provided in the outer reels 26 are not limited. The transparent portion 73 may be formed as large as the two or three inner symbols can be observed. In that case, the backlights behind the transparent portion 73 may emit light the colors of which are correspondent to the displayed plural inner symbols alternatively or in order. Also the whole of the transparent portion 73 does not need to be transparent. For example, a decorating portion being opaque or semitransparent may be disposed around a periphery or in a part of the transparent portion 73.

In the above embodiment, the periphery of the outer reel 26 is formed semitransparently with leaving the transparent portion 73. However, a transparent part may be provided in the periphery of the outer reel 26 or a part of the outer symbol so that the inner reel 25 can be seen slightly. In that case, it is preferable to form the transparent portion 73 smaller in order to curb the influence of the backlight. Also an opaque part, which does not transmit light, may be provided partly.

Although the present invention has been described with respect to the preferred embodiment, the present invention is not to be limited to the above embodiment but, on the contrary, various modifications will be possible to those skilled in the art without departing from the scope of claims appended hereto.

What is claimed is:

1. A symbol display apparatus for game machine, said game machine deciding win or loss according to a symbol combination lined up on a winning line crossing a display window, said symbol display apparatus comprising:

plural reel units which are so disposed as to cross said winning line, at least one of said plural reel units having a double reel structure, said double reel structure including an inner reel and an outer reel which rotate concentrically and independently;

plural inner symbols formed at a predetermined pitch on a periphery of said inner reel, each of said inner symbols having a particular color;

plural outer symbols and at least one window which are formed in a periphery of said outer reel, said window making said inner symbols observable; and at least one backlight disposed inside said inner reel, said backlight carrying out a first illuminating condition, said first illuminating condition being carried out when said window and at least one of said inner symbols stop on said winning line in an overlapped manner, said at least one backlight having a first colored light having a same or similar color as said one inner symbol, to illuminate said one inner symbol inside said window.

2. A symbol display apparatus as recited in claim 1, wherein said first colored light emits light in said first illuminating condition.

3. A symbol display apparatus as recited in claim 1, wherein said backlight carries out a second illuminating condition, said second illuminating condition being carried out when said one outer symbol stops on said winning line, said backlight having a second colored light having a color different from said first colored light, so that said one outer symbol is illuminated through said one inner symbol.

4. A symbol display apparatus as recited in claim 3, wherein said backlight stops emission when one of said outer symbols stops on said winning line.

5. A symbol display apparatus as recited in claim 3, wherein said backlight emits white light in said second illuminating condition by combining light from at least said first and second colored lights.

6. A symbol display apparatus as recited in claim 3, wherein each of said inner symbols are so printed with light color as not to affect said one outer symbol stopping on said winning line in said second illuminating condition.

7. A symbol display apparatus as recited in claim 6, wherein said periphery of said inner reel and said periphery of said outer reel are semitransparent, and said window is transparent.

8. A symbol display apparatus as recited in claim 7, wherein said periphery of said inner reel is formed by means of coloring transparent plastic.

9. A symbol display apparatus as recited in claim 8, wherein said periphery of said outer reel is formed by means of coloring transparent plastic with leaving said window.

10. A symbol display apparatus as recited in claim 9, wherein said one inner symbol appearing inside said window forms said symbol combination with said outer symbols, and a higher prize is awarded than a prize awarded when said symbol combination is formed by only said outer symbols.

11. A symbol display apparatus as recited in claim 10, wherein three of said inner symbols on said inner reel are observed through said window, and said at least one backlight is three backlights, so that each backlight illuminates a correspondent one of said three inner symbols.

12. A symbol display apparatus as recited in claim 11, wherein said each backlight includes a red LED, a blue LED, and a green LED.

13. A symbol display apparatus as recited in claim 11, wherein said outer reel and said inner reel rotate together in one game, and the outer reel stops after the inner reel stops.

14. A symbol display apparatus as recited in claim 13, wherein each of said backlights emits a colored light, a color of said emitted light corresponds to said color of said inner symbol from a stop of said inner reel until a stop of said outer reel.

15. The symbol display apparatus as claimed in claim 1, wherein said first and second colored light are LEDs.

16. A symbol display apparatus for a game machine, said symbol display apparatus comprising:

a winning line crossing a display window said game machine deciding a win or a loss according to a symbol combination lined up on said winning line;

plural reel units which cross said winning line, one of said plural reel units having a double reel structure, said double reel structure including an inner reel and an outer reel which rotate concentrically and independently;

plural inner symbols on a periphery of said inner reel, each of said inner symbols having one of plural colors;

plural outer symbols and a window, which are formed on a periphery of said outer reel, said inner symbols being observable through said window; and an LED inside said inner reel, said LED illuminating a first one of said inner symbols when said window and said first one of said inner symbols stop on said winning line in an overlapped manner, said LED and said first one of said inner symbols having a same or similar one of said plural colors.

17. A symbol display apparatus for a game machine, said game machine deciding a win or a loss according to a symbol combination lined up on a winning line crossing a display window, said symbol display apparatus comprising:

plural reel units which are so disposed as to cross said winning line, at least one of said plural reel units having a double reel structure, said double reel structure including an inner reel and an outer reel which rotate concentrically and independently;

plural inner symbols formed at a predetermined pitch on a periphery of said inner reel, each of said inner symbols having one of a red, a blue and a green color;

plural outer symbols and a window formed on a periphery of said outer reel, three of said inner symbols being observable through said window; and three backlights disposed inside said inner reel, a respective one of said backlights illuminating a corresponding one of said three inner symbols when said window and said inner symbols stop on said winning line in an overlapped manner, each of said backlights having a red LED, a blue LED, and a green LED.

* * * * *